(12) United States Patent
Reuss et al.

(10) Patent No.: US 11,460,618 B2
(45) Date of Patent: Oct. 4, 2022

(54) APPARATUS FOR SELECTIVELY SHAPING PHASE FRONTS OF A LIGHT BEAM, AND USE THEREOF

(71) Applicant: Abberior Instruments GmbH, Goettingen (DE)

(72) Inventors: Matthias Reuss, Goettingen (DE); Joachim Fischer, Karlsruhe (DE)

(73) Assignee: ABBERIOR INSTRUMENTS GMBH, Goettingen (DE)

( * ) Notice: Subject to any disclaimer, the term of this patent is extended or adjusted under 35 U.S.C. 154(b) by 106 days.

(21) Appl. No.: 16/752,885

(22) Filed: Jan. 27, 2020

(65) Prior Publication Data

US 2020/0158935 A1 May 21, 2020

Related U.S. Application Data (63) Continuation of application No. PCT/EP2018/071018, filed on Aug. 2, 2018.

(30) Foreign Application Priority Data

Sep. 27, 2017 (DE) ...................... 10 2017 122 413.0

(51) Int. Cl.
   *G02B 5/30* (2006.01)
   *G02B 27/28* (2006.01)
   *G02B 21/00* (2006.01)

(52) U.S. Cl.
   CPC ........... *G02B 5/30* (2013.01); *G02B 21/0032* (2013.01); *G02B 21/0056* (2013.01);
   (Continued)

(58) Field of Classification Search
   CPC ...... G02B 5/3083; G02B 5/30; G02B 21/002; G02B 21/0032; G02B 21/0056; G02B 21/0068; G02B 21/0076
   See application file for complete search history.

(56) References Cited

U.S. PATENT DOCUMENTS

| 5,062,098 A | 10/1991 | Hori et al. |
| 5,625,613 A | 4/1997 | Kato et al. |

(Continued)

FOREIGN PATENT DOCUMENTS

| DE | 10 2007 025 688 A1 | 12/2008 |
| DE | 10 2012 010 207 A1 | 11/2013 |

(Continued)

OTHER PUBLICATIONS

D. Wildanger et al., "A STED microscope aligned by design", Opt. Exp. 17 (18), 16010-160110 (2009).

(Continued)

*Primary Examiner* — Darryl J Collins
*Assistant Examiner* — Tamara Y. Washington
(74) *Attorney, Agent, or Firm* — Thomas | Horstemeyer, LLP (57) ABSTRACT

An apparatus for selectively shaping phase fronts of a first light beam that is incident along an optical axis and that has a first linear input polarization direction running orthogonal to the optical axis comprises birefringent optical material arranged in all or all bar one of at least three different partial areas that follow to one another in a direction around the optical axis. The optical material is arranged such that a phase of the first light beam is delayed differently in the different partial areas to an extent that increases from partial area to partial area over a round around the optical axis, whereas a phase of a second light beam that is incident along the optical axis and that has a second linear input polarization direction orthogonal to the first linear input polarization direction and to the optical axis is not delayed differently in the different partial areas.

33 Claims, 4 Drawing Sheets

(52) U.S. Cl.
CPC ..... *G02B 21/0068* (2013.01); *G02B 21/0076* (2013.01); *G02B 5/3083* (2013.01)

(56) References Cited

U.S. PATENT DOCUMENTS

| | | |
|---|---|---|
| 8,586,945 B2 | 11/2013 | Reuss et al. |
| 8,755,116 B2 | 6/2014 | Kastrup et al. |
| 10,095,017 B2 | 10/2018 | Anhut et al. |
| 2005/0195480 A1 | 9/2005 | Brown et al. |
| 2007/0159694 A1 | 7/2007 | Brown et al. |
| 2015/0034810 A1 | 2/2015 | Iketaki |

FOREIGN PATENT DOCUMENTS

| | | |
|---|---|---|
| JP | H07234382 A | 9/1995 |
| JP | 2004317646 A | 11/2004 |
| JP | 2012-527634 A | 11/2012 |
| JP | 20120527634 | 11/2012 |
| WO | 2010133678 A1 | 11/2010 |
| WO | 2011086519 A1 | 7/2011 |
| WO | WO-2016092161 A1 * | 6/2016 ......... G01N 21/6458 |
| WO | 2017067998 A1 | 4/2017 |

OTHER PUBLICATIONS

Reuss et al. "Birefringent device convents a standard scanning microscope into a STED microscope that also maps molecular orientation", Optics Express, Osa Publishing, US, Bd 18, Nr. 2, Jan. 18, 2010, pp. 1049-4087, pp. 1052-1053.

Machavariani et al. "Spatially-variable retardation plate for efficient generation of radially—and azimuthallypolarized beams", Optics Communications, Elsevier, Amsterdam, NL, Bd. 281, Nr. 4, 20. Nov. 2007, pp. 732-738.

PRP English Translation for PCT No. PCT/EP2018/071018, dated Nov. 23, 2018.

5 M. Kato, K. Kasazumi: "Improvement of Spatial Frequency Response Characteristics in Optical Scanning System with Coaxial Dual Beams", Jpn. J. Appl. Phys. Vol. 35 (1996), pp. 510-511, Part 1, No. 1B, Jan. 1996.

* cited by examiner

APPARATUS FOR SELECTIVELY SHAPING PHASE FRONTS OF A LIGHT BEAM, AND USE THEREOF

CROSS REFERENCE TO RELATED APPLICATIONS

This application is a continuation to International Application PCT/EP2018/071018 with an international filing date of Aug. 2, 2018 entitled "Apparatus for selectively shaping phase fronts of a light beam, and use thereof" and claiming priority to co-pending German Patent Application No. DE 10 2017 122 413.0 entitled "Vorrichtung für das selektive Formen von Phasenfronten eines Lichtstrahls und deren Verwendung" and filed on Sep. 27, 2017.

FIELD OF THE INVENTION

The invention relates to an apparatus for selectively shaping phase fronts of a first light beam incident along an optical axis and having a first linear input polarization direction running orthogonal to the optical axis. Further, the invention relates to a use of such an apparatus in a common beam path of the first light beam including fluorescence inhibition light and of a second light beam including fluorescence excitation light.

BACKGROUND OF THE INVENTION

If, for example, in high resolution scanning fluorescence microscopy, a light beam of fluorescence excitation light and a light beam of fluorescence inhibition light are focused together in a sample to form an intensity minimum of the fluorescence excitation light in the sample, which coincides with an intensity minimum of the fluorescence inhibition light that is delimited by intensity maxima of the fluorescence inhibition light, the phase fronts of the light beam of fluorescence inhibition light may selectively be deformed or shaped for this purpose. To achieve this selective deformation, the two light beams of fluorescence excitation light and fluorescence inhibition light may only be merged after the phase fronts of the fluorescence inhibition light have been deformed. Alternatively, an apparatus that selectively deforms the phase fronts of the light beam of fluorescence inhibition light, whereas it does not deform the phase fronts of the light beam of fluorescence excitation light may be arranged in a common beam path of both light beams. This apparatus may even deform the phase fronts of the light beam of fluorescence excitation light but only in such a way that this deformation has no effect on the formation of the central intensity maximum of the focused fluorescence excitation light. In STED-fluorescence light microscopy, this concept is known as easySTED, and the corresponding apparatuses are designated as easySTED phase plates.

A wave length and polarization sensitive optical setup usable as an easySTED phase plate and its actual use are known from DE 10 2007 025 688 A1 (corresponding to U.S. Pat. No. 8,755,116 B2). By the optical setup, phase fronts of one light component are deformed, whereas phase fronts of another light component which differs from the one light component in its wave length or its polarization are not deformed. An optical component of the optical setup comprises a discontinuity or local variation of at least $\pi/2$ in a phase delay that it selectively stamps to the one light component over its optically active area. Particularly, the optically active area of the optical component has a circular central area and a periphery annularly extending there around, between which a difference in the phase delay of the one light component is $\pi$, or the optical component stamps to the one light component an increase in the phase delay increasing up to $2\pi$ over a round in a circumferential direction around its optical axis. A phase plate with such a continuously increasing phase delay is also designated as a phase clock. If the two light components differ in their polarization, the optical component has birefringent optical properties. For providing the birefringent optical properties, the optical component may be based on a liquid crystal polymer in which the liquid crystals have a permanent or fixed orientation, or on a birefringent crystal. If the two light components differ in their polarization, a spatial light modulator, like for example on the basis of liquid crystals, may be used as the optical component. With a spatial light modulator, the shape of the phase fronts of a linearly polarized first light component can be designed within wide limits, whereas it leaves unchanged the phase fronts of a second light component polarized orthogonal to the first light component.

A fluorescence light microscope having a birefringent beam shaping apparatus is known from WO 2010/133678 A1. The beam shaping apparatus comprises a birefringent chromatic optical element that shapes a polarization distribution of a light beam of fluorescence inhibition light over its beam cross section such that the fluorescence inhibition light once focused comprises an intensity distribution having zero intensity at the focus point. On the other hand, the birefringent chromatic optical element leaves a light beam of fluorescence excitation light having another wavelength than that one of the fluorescence inhibition light untouched to such an extent that the focused fluorescence excitation light has a maximum intensity at the focus point. The birefringent chromatic optical element consists of a segmented chromatic $\lambda/2$ plate, the birefringent material of the $\lambda/2$ plate having different orientations of its fast axis in the individual segments. Particularly, the chromatic $\lambda/2$-plate includes circle segments of a same size and of same differences in the orientation of the fast axis from circle segment to circle segment in a direction around an optical axis of the optical setup. In this beam shaping apparatus, the formation of the zero intensity of the fluorescence inhibition light at the focus point is based on the polarization distribution over its beam cross section.

A segmented chromatic beam shaping apparatus for implementing the easySTED concept that consists of three circle segments arranged around an optical axis is known from D. Wildanger et al., "A STED microscope aligned by design", Opt. Exp. 17 (18), 16010-160110 (2009). Phase fronts of a light beam of fluorescence inhibition light are delayed differently by the different circle segments, whereas wave fronts of a light beam of fluorescence excitation light remain plane. For this purpose, each of the three circle segments consists of two optical plates of materials whose diffraction indices are equal at the wave length of the fluorescence excitation light but significantly differ at the wave length of the fluorescence inhibition light. With a same thickness of all pairs of optical plates which are stacked along the optical axis, the phase delays that are introduced at the wave length of the fluorescence excitation light are equal for all pairs, whereas the phase delays of the fluorescence inhibition light are a function of the difference in refraction indices between the two optical plates and the relative thickness of the two optical plates of each pair.

All known concepts of a chromatic easySTED phase plate have the disadvantage, that they are only effective in the desired way over small wave length areas of the wave length of the excitation light and/or of the fluorescence inhibition light. Further, they are unsuited for differently shaping light beams of excitation light and fluorescence inhibition light which do not differ in their wave length but in their intensities as this, for example, may be the case in RESOLFT-fluorescence light microscopy with switchable molecules. The concept known from DE 10 2007 025 688 A1 of an easySTED phase plate that shall make use of different polarizations of the excitation light and the fluorescence inhibition light—except of the embodiment comprising the spatial light modulator—remains so vague that a reduction to practice is not possible.

A microscope having a phase plate for selectively shaping phase fronts of a first light beam incident along an optical axis and having a first linear input polarization direction running orthogonal to the optical axis is known from DE 10 2012 010 207 A1 (corresponding to U.S. Pat. No. 10,095,017 B2). The circular phase plate consists of two hemicycle elements which are facing each other across the optical axis. One of the two elements is a $\lambda/2$ plate made of a birefringent material. The other of the two elements consists of glass. If a light beam polarized parallel to the extraordinary axis of the $\lambda/2$ plate passes through this phase plate, a phase shift by half a wave length is caused in the $\lambda/2$ plate as compared to the element made of glass. If the polarization of the light beam, on the other hand, is orthogonal to the extraordinary axis of the $\Delta/2$ plate, no relative phase delay is caused. DE 10 2012 010 207 A1 (corresponding to U.S. Pat. No. 10,095,017 B2) also discloses a further embodiment of the phase plate in which the phase plate is divided into four equally sized circle segment-shaped elements following to one another in circumferential direction around the optical axis. The elements are alternately $\lambda/2$ plates and elements of glass such that the two $\lambda/2$ plates, on the hand, and the elements of glass, on the other hand, are facing each other across the optical axis. In focusing the light beam having the first linear input polarization direction orthogonal to the optical axis, an intensity distribution with a local intensity minimum surrounded by intensity maxima is formed which is based on the phase offset of $\lambda/2$-plates between the parts of the light beam passing through the phase plates and the parts of the light beam passing through the elements of glass.

There still is a need of an apparatus for selectively shaping phase fronts of a first light beam incident along an optical axis, which, in application as an easySTED phase plate, is both suited for different wave lengths of fluorescence inhibition light whose phase fronts are to be shaped and for different wave lengths of fluorescence excitation light whose phase fronts are not to be shaped, and in which the fluorescence inhibition light and the fluorescence excitation light may even have equal wave lengths.

SUMMARY OF THE INVENTION

The present invention relates to an apparatus for selectively shaping phase fronts of a first light beam that is incident along an optical axis and that has a first linear input polarization direction running orthogonal to the optical axis. The apparatus comprises at least three different partial areas that follow to one another in a direction around the optical axis, and birefringent optical material arranged in all or all bar one of the different partial areas. The birefringent optical material is arranged such that a first phase of the first light beam is delayed differently in the different partial areas, wherein the birefringent optical material delays the first phase of the first light beam to an extent that increases in the direction from partial area to partial area over a round around the optical axis. Further, the birefringent optical material is arranged such that a second phase of a second light beam that is incident along the optical axis and that has a second linear input polarization direction orthogonal to the first linear input polarization direction and to the optical axis is not delayed differently in the different partial areas.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

The apparatus according to the invention selectively shapes phase fronts of a first light beam incident along an optical axis and having a first linear input polarization direction running orthogonal to the optical axis. The apparatus comprises birefringent optical material. The apparatus delays a first phase of the first light beam differently in at least three different partial areas of the apparatus, whereas it does not delay a second phase of a second light beam incident along the optical axis and having a second input polarization direction orthogonal to the first linear input polarization direction and to the optical axis differently in the different partial areas.

In this description and the accompanying claims, the definition that a phase is not delayed differently in the different partial areas of the apparatus means that that the phase is delayed either in fact exact equally or by phase delays whose amounts differ by $2\pi$ or an integer multiple of $2\pi$ in the different partial areas of the apparatus. These two embodiment of the feature that the phase of the second light beam is not delayed differently in the different partial areas of the apparatus are equivalent at least as long as the coherence length of the second beam of light is longer than the maximum multiple of $2\pi$.

In the apparatus according to the invention, the different partial areas follow to one another in a direction around the optical axis. The birefringent optical material is arranged in all or all bar one of the different partial areas following to one another in the direction around the optical axis. With a total of three different partial areas, this means that the birefringent material may be arranged in only two of the different partial areas following to one another in the direction around the optical axis.

The birefringent optical material delays the first light beam having the first input polarization direction with respect to its phase to an extent increasing from partial area to partial area over a round around the optical axis. This extent may particularly increase towards $2\pi$. However, the value of the phase delay of $2\pi$ itself is not reached due to the increase of the phase delay from partial area to partial area in discrete steps.

Thus, a phase clock for the first light beam is approximated with the apparatus according to the invention. With only two different partial areas following to one another in the direction around the optical axis, like in case of the phase plate known from DE 10 2012 010 204 A1, this approximation is not yet achieved, and a line shaped intensity maximum between two kidney shaped intensity maxima results in the focal plane.

Preferably, the first phase of the first light beam is delayed differently in at least four, even more preferred in at least six different partial areas of the apparatus to delimit an as point shaped as possible intensity minimum by a continuous annular intensity maximum of the light of the first light beam in the focal plane.

Whether the apparatus according to the invention influences the phase of a light beam does generally not depend on the wave length but on the input polarization direction of the light beam. Thus, the first and the second light beam may even have equal wave lengths as long as they have the first input polarization direction and the second input polarization orthogonal thereto.

In order to ensure the independency of the apparatus according to the invention of the wave lengths of the light beams over an as broad wave length range as possible, the birefringent optical material, in all partial areas in which it is actually arranged, is arranged in such a material combination that the different partial areas each display an achromatic birefringent behavior over the entire as broad as possible wave length area. The composition of suitable material combinations for forming such achromatic phase plates is familiar to one skilled in the art.

The different partial areas of the apparatus according to the invention following to one another in the direction around the optical axis may each have a portion that is circle segment-shaped in a projection along the optical axis and that adjoins a circle segment-shaped portion of a neighboring partial area in the direction around the optical axis and in a direction opposite thereto. For example, the partial areas of the apparatus comprising the circle segment-shaped portions may have square or other rectangular or even rhombic overall dimensions. Typically, the circle segment-shaped portions will not be separated from the remainders of the square or rectangular or partial areas. Preferably, however, the circle segment-shaped portions of the different partial areas are located in the active area of the optical apparatus, in which the light beams are incident.

The circle segment-shaped portions of the different partial areas may each extend over same angles around the optical axis. Particularly in this case, the extent of the delay of the phases of the first light beam may increase from partial area to partial area by $2\pi/n$ with n different partial areas following to one another in the direction around the optical axis. With an increase of n, the apparatus gets closer and closer to an ideal phase clock.

In the apparatus according to the invention, the effective crystal axes of the birefringent material may be aligned parallel to each other in all different partial areas which differently delay the phase of the first light beam having the first input polarization direction as compared to the phase of the second light beam having the second input polarization direction orthogonal thereto. The effective crystal axes of the birefringent material are defined here in that a light beam having an input polarization direction along these effective crystal axes is delayed stronger or weaker than a light beam having an input polarization direction orthogonal to the effective crystal axes. Thus, the slow or fast crystal axes of the birefringent material particularly belong to these effective crystal axes. In the apparatus according to the invention, the birefringent material may thus be equally aligned with regard to the orientation of its crystal axes in all different partial areas which differently delay the phase of the first light beam as compared to the phase of the second light beam.

In an embodiment of the apparatus according to the invention, each of its different partial areas is made as a plate segment of one segmented phase plate. Preferably, however, at least two plate segments of at least two segmented phase plates are arranged in each of the different partial areas such that they follow to one other along the optical axis. This means that at least two segmented phase plates are stacked. In both embodiments, the apparatus according to the invention will have a same thickness in all its different partial areas.

It is particularly preferred, if one of the at least two segmented phase plates comprises m-times as many plate segments as another of the at least two segmented phase plates, wherein m is a positive integer $\geq 2$, and wherein m plate segments of the one of the at least two segmented phase plates are arranged on each plate segment of the other of the at least two segmented phase plates. The respective m plate segments of the one segmented phase plates thus subdivide the one plate segment of the other of the at least two segmented phase plates m-times. In this embodiment, the total number of the different partial areas of the apparatus according to the invention following to one another in the direction around the optical axis is at least as high as the number of the plate segments of the one of the at least two segmented phase plates. Due to the fact that the other segmented phase plate comprises at least two segments and the one segmented phase plates comprises m-times more segments, the total number of the partial areas of the apparatus according to the invention following to one another in the direction around the optical axis is at least $2\times m$ with $m \geq 2$, i.e. at least four.

In an embodiment of the apparatus according to the invention, the segmented phase plates may be made in a very simple way. For example, the other of the at least two segmented phase plates may comprise two plate segments that delay the phase of the second light beam by equal amounts and that delay the phase of the first light beam by amounts differing by $\pi$. Then, the one of the at least two segmented phase plates may have four plate segments, which delay the phase of the second light beam by equal amounts and of which two first plate segments, as compared to two second plate segments, delay the phase of the first light beam by amounts differing by $\pi/2$, wherein the first plate segments and the second plate segments alternately following to each other in the direction around the optical axis. In other words, the device may be made by means of one plate segment effective as a $\lambda/2$ plate and one neutral plate segment of the one segmented phase plate and by means of two plate segments effective as $\lambda/4$ plates and two neutral plate segments of the other segmented phase plate. The $\lambda/2$ and $\lambda/4$ plates formed by the plate segments may also be $\lambda/2$ and $\lambda/4$ plates of higher order, in which the selective delay of the first light beam is not just $\lambda/2$ but in fact $(k \times \lambda + \lambda/2)$ and not just $\lambda/4$ but in fact $(l \times \lambda + \lambda/4)$, respectively, wherein k and l are positive integers, which are independent of each other.

Any neutral plate segments or, in other words, all plate segments or full partial areas of the apparatus according to the invention that equally delay the phase of the first light beam and the phase of the second light beam, may be made in that the optical crystal axis of the birefringent material is aligned parallel to the optical axis of the apparatus. The optical crystal axis of a birefringent material is defined in that light incident along this crystal axis is phase delayed equally independent of its polarization direction. Generally, the neutral plate segments or partial areas may also be made of non-birefringent material.

By applying the above design principles to the apparatus according to the invention, all partial areas of the apparatus according to the invention or at least all plate segments of the respective segmented phase plate may be made of the same birefringent material. As already indicated, it may be achieved in its way that all partial areas and optionally even all plate segments of each segmented phase plate have same extensions along the optical axis. In this way, particularly good preconditions are present for an achromatic design of the entire apparatus, because all components of the first and the second light beams, in all partial areas of the apparatus following to one another in the direction around the optical axis, pass through same thicknesses of the birefringent optical material which is also identical in all these partial areas. The concept of making all different partial areas of an apparatus for selectively shaping phase fronts of a first light beam without deforming the wave fronts of a differently polarized second light beam of birefringent optical material and particularly of the same birefringent optical material, wherein the optical material is arranged in at least one part of at least one of the different partial areas such that its optical crystal axis is aligned parallel to the optical axis of the apparatus in that part is regarded as an invention in its own right, independently of whether the different partial areas follow to one another in a direction around the optical axis and whether the birefringent optical material delays the first light beam having the first input polarization direction with regard to its phase to an extent increasing from partial area to partial area over a round around the optical axis in this direction. For the sake of unity of the invention, this invention in its own right is not separately claimed in the claims. A possible definition of this invention in its own right reads: Apparatus for selectively shaping phase fronts of a first light beam incident along an optical axis and having a first linear input polarization direction orthogonal to the optical axis, wherein the apparatus comprises at least two different partial areas, wherein the apparatus delays a first phase of the first light beam differently in the at least two different partial areas of the apparatus, and wherein the apparatus does not delay a second phase of a second light beam incident along the optical axis and having a second input polarization direction orthogonal to the first linear input polarization direction and to the optical axis differently in the at least two different partial areas, wherein all of the at least two different partial areas are made of a same birefringent material, and wherein an optical crystal axis of the birefringent optical material is aligned parallel to the optical axis in at least one of the at least two different partial areas so that the birefringent material does equally delay the phase of the first light beam and the phase of the second light beam in this at least one of the at least two different partial areas. Optionally, all of the at least two different partial areas are made of the same birefringent material. Embodiments of this invention in its own right comprise the further feature of the attached claims. In an embodiment of the invention in its own right, which does not fall under the attached claims, the at least two different partial areas of the apparatus include a circular central area and a periphery annularly extending there around, wherein a difference in the phase delay of the first light beam between the central area and the periphery is $\pi$, as it is generally known from DE 10 2007 025 688 A1.

In the apparatus according to the invention, a polarization rotator transferable between a first and a second state may be arranged on the optical axis upstream of the different partial areas following to one another in the direction around the optical axis. In the first state, the polarization rotator alters a polarization direction of an input light beam in the first linear input polarization direction of the first light beam, and, in the second state, it alters the polarization direction of the input light beam in the second linear input polarization direction of the second light beam. For example, the polarization rotator may alternately alter a circular polarization of the input light beam in the first and the second input polarization direction. In a particular embodiment, the polarization rotator has at least one Pockels cell. Other possibilities of implementing the polarization rotator are known to one skilled in the art.

The apparatus according to the invention may particularly be placed in a common beam path of a first light beam of fluorescence inhibition light and a second light beam of fluorescence excitation light. Then, the phase fronts of the first light beam are selectively shaped such that, when together focusing the first light beam and the second light beam in a sample, an intensity distribution of the fluorescence inhibition light having a local intensity minimum surrounded by intensity maxima and an intensity distribution of the fluorescence excitation light having an intensity maximum at the location of the intensity minimum of the intensity distribution of the fluorescence inhibition light are formed. This use of the apparatus according to the invention may particularly be applied in high resolution fluorescence microscopy, particularly STED fluorescence microscopy and RESOLFT fluorescence light microscopy.

Figure 1:
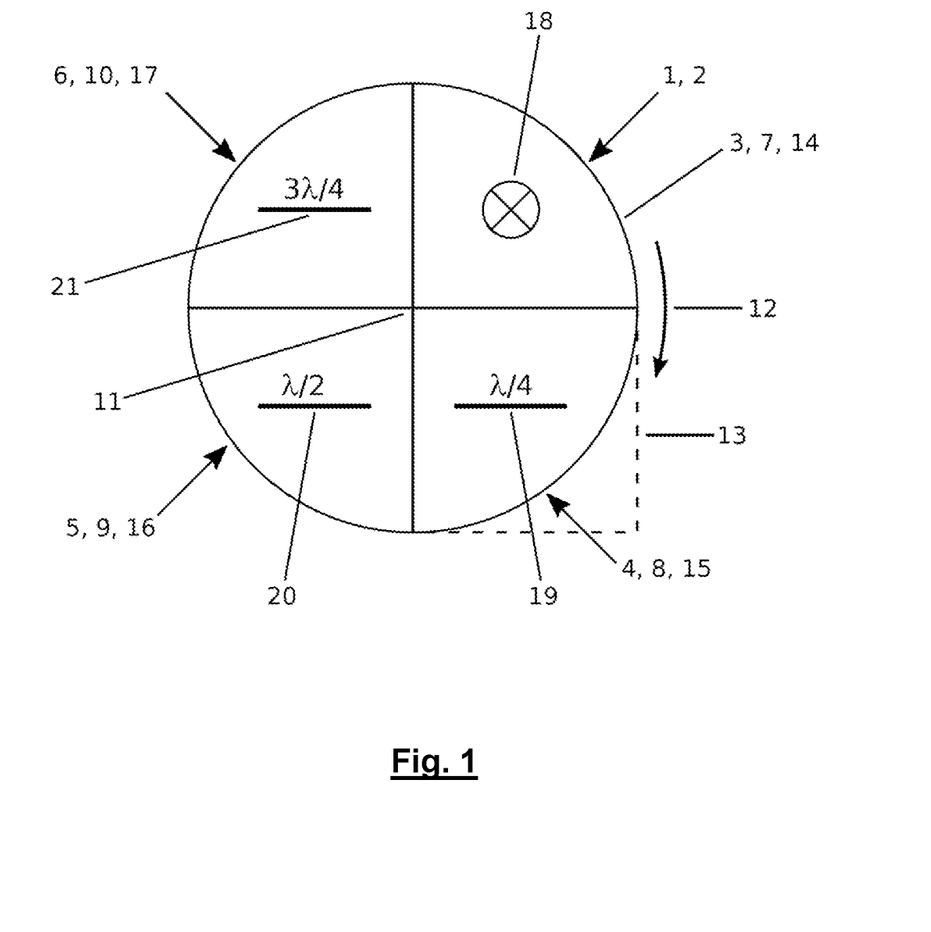
FIG. 1 is an axial top view of a first embodiment of the apparatus according to the invention having four partial areas following to one another in a direction around an optical axis.

Referring now in greater detail to the drawings, an apparatus 1 according to the invention depicted in FIG. 1 is a segmented phase plate 2. Correspondingly, each of four different partial areas 3 to 6 of the apparatus 1 is made of a plate segment 7 to 10 of the segmented phase plate 2. The partial areas 3 to 6 are arranged around an optical axis 11 of the apparatus 1 and follow directly to one another in a direction 12 around the optical axis 11. Each of the partial areas 3 to 6 extends over a same angle, here of 90°, around the optical axis 11. The partial areas 3 to 6 are depicted as being circle segment-shaped, here. However, in one partial area 4 it is indicated with a dashed line 13 that each partial area 3 to 6 and the corresponding plate segment 7 to 10 could, for example, have square or other rectangular dimensions. Even in this case, each partial area 3 to 6 includes a circle segment-shaped portion.

In the present case, each plate segment 7 to 10 consists of a birefringent material 14 to 17, wherein the birefringent materials 14 to 17 may be equal or even the same birefringent material. In the partial area 3, the birefringent material 14 is arranged such that its optical crystal axis runs parallel to the optical axis 11. Thus, a phase of a light beam incident along the optical axis 11 is delayed independently on the polarization of the light beam in the partial area 3. Therefore, the plate segment 7 in the partial area 3 may alternatively be made of a non-birefringent material. The plate segment 8 makes up a λ/4 plate for a first light beam incident along the optical axis 11 and having a linear input polarization direction running along an effective crystal axis 19 of the birefringent material 15 so that plate segment 8 delays the phases of this light beam in so far as it is passing through the partial area 4 with regard to the phases of the light beam in so far as it passes through the partial area 3 by π/2. For a second light beam having a linear input polarization direction orthogonal to the effective crystal axis 19 and the optical axis 11, these different phase delays in the partial areas 3 and 4 do not occur.

In the partial area 5, the birefringent material 16 comprises an effective crystal axis 20 running parallel to the effective crystal axis 19. For the first light beam incident along the optical axis 11 and having the linear input polarization direction along the effective crystal axes 19 and 20, the plate segment 9 forms a λ/2 plate so that the phase of this light beam is delayed by π in the partial area 5 as compared to the partial area 3. The phase of the second light beam having the input polarization direction orthogonal to the optical axis 11 and to the effective crystal axis 10, however, is not delayed in this partial area 5 in another way than in the partial area 3. In the partial area 6, the birefringent material 17 has an effective crystal axis 21 which runs parallel to the effective crystal axes 19 and 20. For the first light beam having the linear input polarization direction along the effective crystal axes 19 to 21, the plate segment 10 forms a 3λ/4 plate so that its phases, as compared to the partial area 3, are delayed by 3π/2. For the second light beam having the linear input polarization direction running orthogonal to the optical axis 11 and the effective crystal axes 19 to 21, this effect does not occur so that no additional phase delay as compared to the partial area 3 results in the partial area 6.

In summary, the apparatus 1 forms a discretized phase clock of phase delays increasing in the direction 12 starting from the partial area 3 in π/2 steps for the first light beam having the input polarization direction running orthogonal to the optical axis 11 in parallel to the effective crystal axes 19 to 21. For the second light beam having the linear input polarization direction running orthogonal to the optical axis 11 and to the effective crystal axes 19 to 21, however, no different effects on its phase result in the different partial areas 3 to 6. This, however, does not exclude that phase delays, which differ by an integer multiple of 2π, occur in the different partial areas 3 to 6.

Particularly, the apparatus 1 may be used as an easySTED phase plate, wherein the apparatus 1 leaves fluorescence excitation light having the linear input polarization direction orthogonal to the optical axis 11 and the effective crystal axes 19 to 21 unaffected so that it is focused by a downstream objective lens such that an intensity maximum of the fluorescence excitation light results at the focus point, whereas the apparatus 1 deforms the phase fronts of fluorescence inhibition light having a linear input polarization direction along the effective crystal axes 19 to 21 such that, when being focused, it forms a local intensity minimum, preferably a zero point, which is delimited by intensity maxima of the fluorescence inhibition light in the focal plane in all directions, at the location of the intensity maximum of the excitation light.

Figure 2:
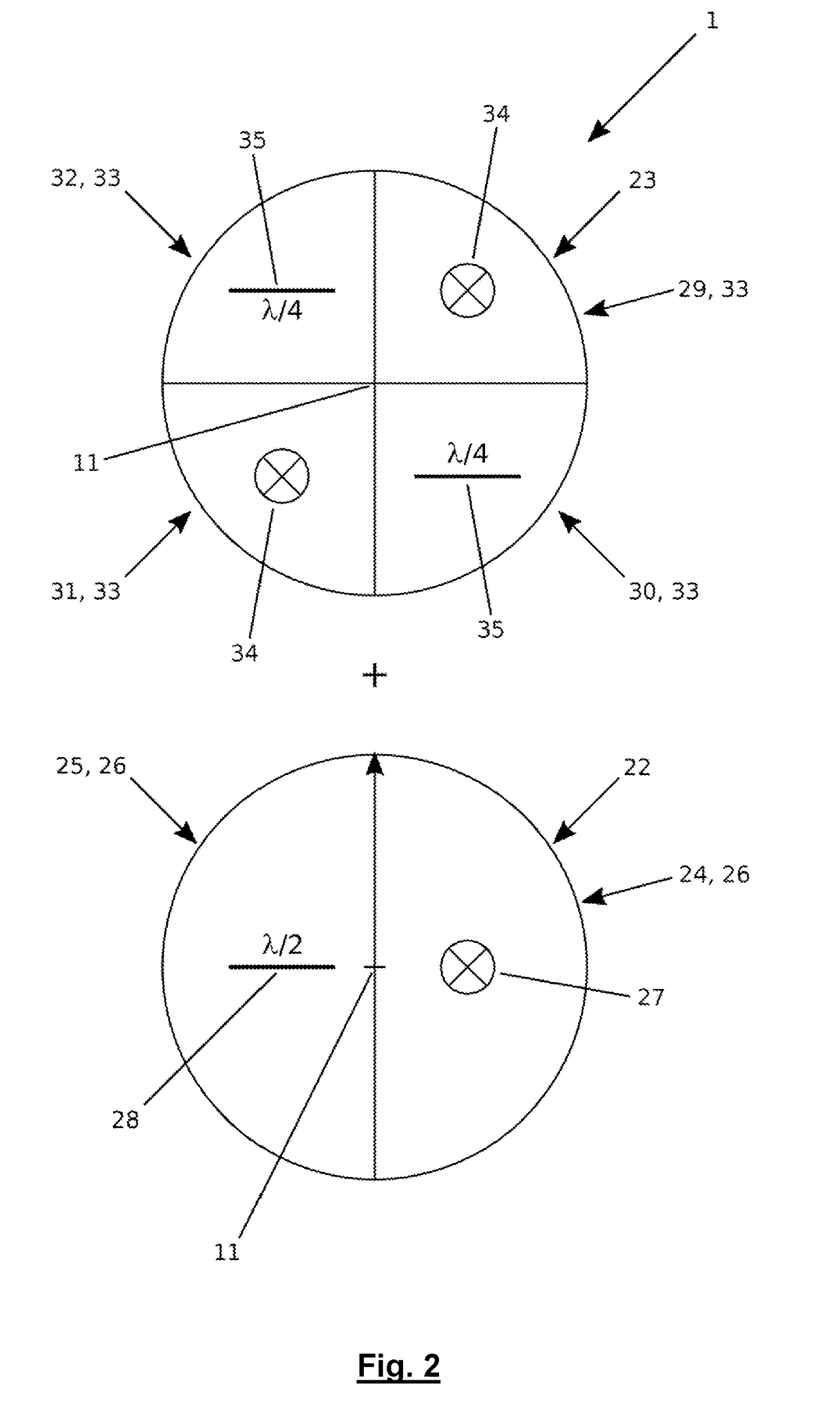
FIG. 2 shows two segmented phase plates, each in an axial top view, which are to be stacked to make up a further embodiment of the apparatus according to the invention with four different partial areas following to one another in direction around the optical axis.

FIG. 2 shows two segmented phase plates 22 and 23 which are to be stacked in direction of the optical axis 11 to achieve an apparatus 1 which, in its four partial areas 3 to 6, causes the same different phase delays selectively for the first light beam having the linear input polarization direction along the effective crystal axis as the apparatus 1 according to FIG. 1. The segmented phase plate 22 only has two plate segments 24 and 25 which each extend over two partial areas 3 and 4, and 5 and 6, respectively, of the resulting apparatus 1. Both plate segments 24 and 25 consist of the same birefringent optical material 26, and they have the same material thickness along the optical axis 11. In the plate segment 24, the optical crystal axis 27 of the birefringent material 26 is aligned parallel to the optical axis 11. In the plate segment 25 the effective crystal axis 28 of the birefringent material 26 runs parallel to the effective crystal axes 20 and 21 according to FIG. 1. Here, the plate segment 25 forms a λ/2 plate for the first light beam incident along the optical axis 11 and having the input polarization direction parallel to the effective crystal axis 28.

The segmented phase plate 23, which is to be stacked on the segmented phase plate 22 along the optical axis 11 from above or below, includes four plate segments 29 to 32. In the apparatus 1, the plate segments 29 and 30 of these four plate segments 29 to 32 cover the plate segment 24, and the plate segments 31 and 32 of these four plate segments 29 to 32 cover the plate segment 25. All plate segments 29 to 32 consist of the same birefringent optical material 33. The birefringent optical material 33 may be identical to the birefringent optical material 26. In all plate segments 29 to 32, the birefringent material 23 has a same material thickness along the optical axis 11. In the plate segments 29 and 31, the optical crystal axis 34 of the birefringent material 23 is aligned parallel to the optical axis 11. In the plate segments 30 and 32, the effective crystal axis 35 of the birefringent material 33 runs parallel to the effective crystal axes 19 and 21 according to FIG. 1. The plate segments 30 and 32 each form a λ/4 plate for the first light beam incident along the optical axis 11 and having the input polarization direction parallel to the effective crystal axis 35.

By stacking the two segmented phase plates 22 and 23, those phase delays in the partial areas 3 to 6 result, which have already been explained with reference to FIG. 1. They are achieved by same material thicknesses along the optical axis 11 in each of the partial areas 3 to 6 and by using a conventional λ/2 plate as the plate segment 25 and two conventional λ/4 plates as the plate segments 30 and 32.

Figure 3:
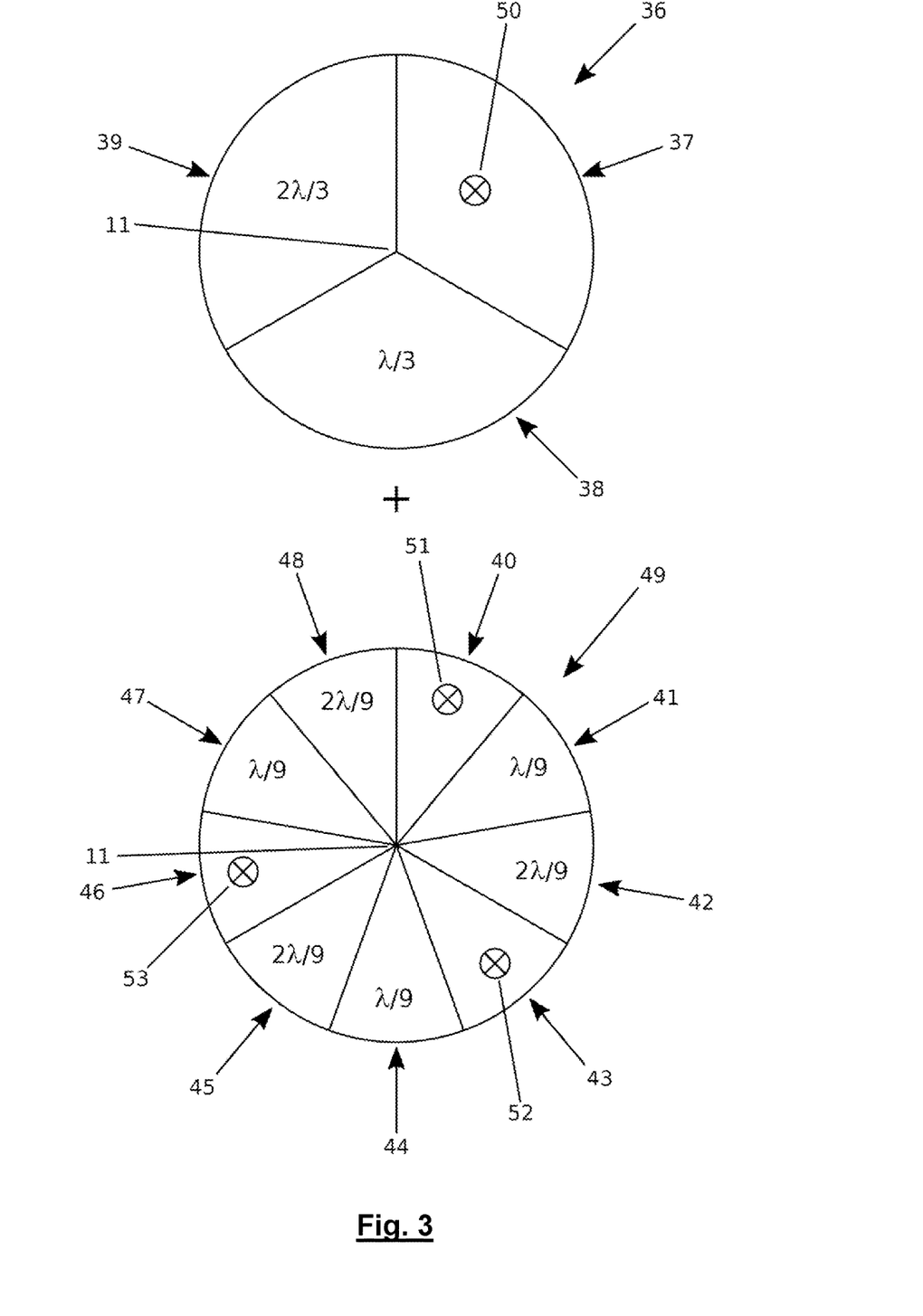
FIG. 3 is a view corresponding to FIG. 2 of two segmented phase plates, which are to be stacked to make up an embodiment of the apparatus according to the invention having nine different partial areas following to one another in direction around the optical axis.

FIG. 3 shows an enhancement of the concept according to FIG. 2 with an increased number of the resulting different partial areas 3 to 6 of the apparatus 1 but still with only two segmented phase plates to be stacked. According to FIG. 3, a segmented phase plate 36 comprises three plate segments 37 to 39 onto each of which three plate segments 40 to 42, 43 to 45, and 46 to 48, respectively, of a higher segmented phase plate 49 are to be arranged in stacking. Here, the optical crystal axes 50 to 53 of the plate segments 37, 40, 43 and 46 are each aligned parallel to the optical axis 11, and the remaining phase plates form phase plates having the phase delay values indicated in FIG. 3 selectively for the first light beam incident along the optical axis 11 and having the linear input polarization direction running horizontally in FIG. 3. For the first light beam having this linear input polarization direction, the stack of these segmented phase plates 36 and 39 is a discretized phase clock having a phase delay increasing in steps of 2π/9 in the direction 12 according to FIG. 1 around the optical axis 11.

In a double column "1st segmented phase plate", the following table 1 indicates the phase delays of the first light beam having the linear input polarization direction adjusted to the effective crystal axis of the birefringent material, which are caused by the segmented phase plate 36 according to FIG. 3. A double column "2nd segmented phase plate" documents the phase delays, which are achieved by the plate segments of the segmented phase plate 49 according to FIG. 3. The third double column "3rd segmented phase plate" adds further optional phase delays by plate segments of a further stacked segmented phase plate. The total phase delays of the first light beam having the linear input polarization direction adjusted to the effective crystal axes in the total 27 different partial areas of the entire apparatus can be calculated as sum over the respective line of table 1. Over a round around the optical axis 11 in the direction 12 according to FIG. 1, the phase delays increase in steps of $2\pi/27$ towards $2\pi$.

TABLE 1

| 1st segmented phase plate | | 2nd segmented phase plate | | 3rd segmented phase plate | |
|---|---|---|---|---|---|
| plate segment | phase delay | plate segment | phase delay | plate segment | phase delay |
| 1 | 0 | 1 | 0 | 1 | 0 |
|   |   |   |   | 2 | $2\pi/27$ |
|   |   |   |   | 3 | $4\pi/27$ |
|   |   | 2 | $2\pi/9$ | 4 | 0 |
|   |   |   |   | 5 | $2\pi/27$ |
|   |   |   |   | 6 | $4\pi/27$ |
|   |   | 3 | $4\pi/9$ | 7 | 0 |
|   |   |   |   | 8 | $2\pi/27$ |
|   |   |   |   | 9 | $4\pi/27$ |
| 2 | $2\pi/3$ | 4 | 0 | 10 | 0 |
|   |   |   |   | 11 | $2\pi/27$ |
|   |   |   |   | 12 | $4\pi/27$ |
|   |   | 5 | $2\pi/9$ | 13 | 0 |
|   |   |   |   | 14 | $2\pi/27$ |
|   |   |   |   | 15 | $4\pi/27$ |
|   |   | 6 | $4\pi/9$ | 16 | 0 |
|   |   |   |   | 17 | $2\pi/27$ |
|   |   |   |   | 18 | $4\pi/27$ |
| 3 | $4\pi/3$ | 7 | 0 | 19 | 0 |
|   |   |   |   | 20 | $2\pi/27$ |
|   |   |   |   | 21 | $4\pi/27$ |
|   |   | 8 | $2\pi/9$ | 22 | 0 |
|   |   |   |   | 23 | $2\pi/27$ |
|   |   |   |   | 24 | $4\pi/27$ |
|   |   | 9 | $4\pi/9$ | 25 | 0 |
|   |   |   |   | 26 | $2\pi/27$ |
|   |   |   |   | 27 | $4\pi/27$ |

Figure 4:
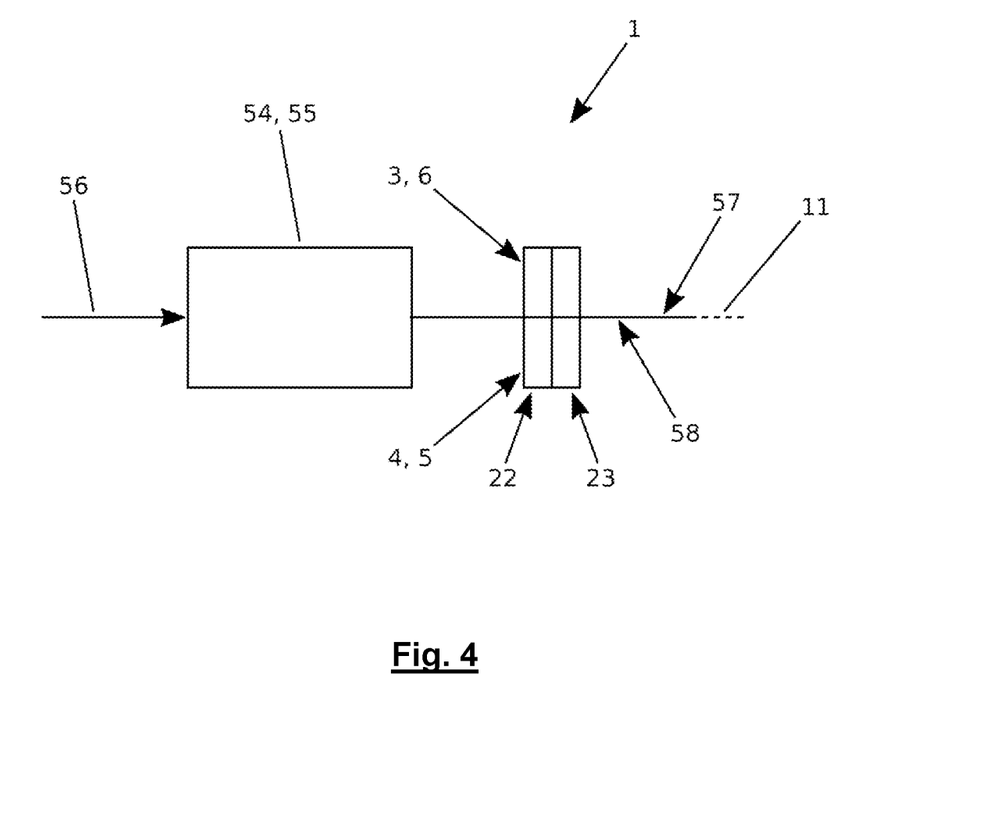
FIG. 4 is a side view of an embodiment of the apparatus according to the invention with an additional polarization rotator.

FIG. 4 illustrates that in an embodiment of the apparatus 1 which generally corresponds to the embodiment according to FIG. 2 having two stacked segmented phase plates 22 and 23, a polarization rotator 54 is arranged upstream of the partial areas 3 to 6. The polarization rotator may, for example, be made as a Pockels cell 55 and may alter a circular input polarization of an input light beam 36 alternately in two linear input polarization directions running orthogonal to one another and orthogonal to the optical axis 11. Thus, the first light beam 57 having the input polarization direction which runs along the effective crystal axes of the segmented phase plates 22 and 23 and the second light beam 58 whose linear input polarization direction runs orthogonal to the effective crystal axis of the birefringent material of the segmented phase plates 22 and 23 alternately get out of the polarization rotator 54.

Many variations and modifications may be made to the preferred embodiments of the invention without departing substantially from the spirit and principles of the invention. All such modifications and variations are intended to be included herein within the scope of the present invention, as defined by the following claims.

We claim:

1. An apparatus for selectively shaping phase fronts of a first light beam that is incident along an optical axis and that has a first linear input polarization direction running orthogonal to the optical axis, wherein the apparatus comprises
    at least three different partial areas that follow to one another in a direction around the optical axis, and
    birefringent optical material arranged in all or all bar one of the different partial areas,
    wherein the birefringent optical material is arranged such that a first phase of the first light beam is delayed differently in the different partial areas, wherein the birefringent optical material delays the first phase of the first light beam to an extent that increases in the direction from partial area to partial area over a round around the optical axis,
    wherein the birefringent optical material is arranged such that a second phase of a second light beam that is incident along the optical axis and that has a second linear input polarization direction orthogonal to the first linear input polarization direction and to the optical axis is not delayed differently in the different partial areas, and
    wherein each of the different partial areas is made as a plate segment of a segmented phase plate.

2. The apparatus of claim 1, wherein a total number of the different partial areas is at least four.

3. The apparatus of claim 1, wherein the different partial areas each have a portion that is circle segment-shaped in a projection along the optical axis and that adjoins a circle segment-shaped portion of a neighboring partial area both in the direction around the optical axis and in a direction opposite thereto.

4. The apparatus of claim 3, wherein the circle segment-shaped portions of the different partial areas extend over same angles around the optical axis.

5. The apparatus of claim 1, wherein, with a total number n of the different partial areas, the extent of the delay of the phases of the first light beam increases by $2\pi/n$ from partial area to partial area.

6. The apparatus of claim 1, wherein effective crystal axes of the birefringent material are aligned parallel to each other in all of the different partial areas that differently delay the phase of the first light beam as compared to the phase of the second light beam.

7. The apparatus of claim 1, wherein all of the different partial areas are made of a same birefringent material.

8. The apparatus of claim 1, wherein a polarization rotator that is transferable between a first and a second state is arranged upstream of the different partial areas on the optical axis, wherein the polarization rotator, in its first state, alters a polarization of an input light beam in the first linear input polarization direction of the first light beam, and wherein the polarization rotator, in its second state, alters the polarization of the input light beam in the second linear input polarization direction of the second light beam.

9. A use of the apparatus of claim 1 in a common beam path of the first light beam and the second light beam,
    wherein the first light beam includes fluorescence inhibition light and the second light beam includes fluorescence excitation light, and wherein the phase fronts of the first light beam are shaped selectively such that, in together focusing the first light beam and the second light beam in a sample, an intensity distribution of the fluorescence inhibition light having a local intensity minimum surrounded by intensity maxima and an intensity distribution of the fluorescence excitation light having an intensity maximum at the location of the intensity minimum of the intensity distribution of the fluorescence inhibition light are formed.

10. The apparatus of claim 1, wherein one of the different partial areas equally delays the first phase of the first light beam and the phase of the second light beam, wherein an optical crystal axis of the birefringent optical material is aligned with the optical axis in the one of the different partial areas that equally delays the first phase of the first light beam and the phase of the second light beam.

11. An apparatus for selectively shaping phase fronts of a first light beam that is incident along an optical axis and that has a first linear input polarization direction running orthogonal to the optical axis, wherein the apparatus comprises at least three different partial areas that follow to one another in a direction around the optical axis, and birefringent optical material arranged in all or all bar one of the different partial areas, wherein the birefringent optical material is arranged such that a first phase of the first light beam is delayed differently in the different partial areas, wherein the birefringent optical material delays the first phase of the first light beam to an extent that increases in the direction from partial area to partial area over a round around the optical axis, wherein the birefringent optical material is arranged such that a second phase of a second light beam that is incident along the optical axis and that has a second linear input polarization direction orthogonal to the first linear input polarization direction and to the optical axis is not delayed differently in the different partial areas, and wherein at least two plate segments of at least two stacked segmented phase plates follow to each other along the optical axis in each of the different partial areas.

12. The apparatus of claim 11, wherein one of the at least two segmented phase plates comprises $m$-times as many plate segments as another of the at least two segmented phase plates, wherein $m$ plate segments of the one of the at least two segmented phase plates are arranged on every plate segment of the other of the at least two segmented phase plates.

13. The apparatus of claim 12, wherein the other of the at least two segmented phase plates has two plate segments that delay the first phase of the first light beam by first phase delays whose amounts differ by $\pi$ and that delay the second phase of the second light beam by equal second phase delays.

14. The apparatus of claim 13, wherein the one of the at least two segmented phase plates has four plate segments that delay the second phase of the second light beam by equal second phase delays, wherein two first plate segments of the four plate segments, on the one hand, and two second plate segments of the four plate segments, on the other hand, delay the first phase of the first light beam by fourth phase delays whose amounts differ by $\pi/2$, wherein the first plate segments and the second plate segments alternately follow to each other in the direction around the optical axis.

15. The apparatus of claim 11, wherein at least one of the plate segments equally delays the first phase of the first light beam and the phase of the second light beam, wherein an optical crystal axis of the birefringent optical material is aligned with the optical axis in the at least one of the plate segments that equally delays the first phase of the first light beam and the phase of the second light beam.

16. The apparatus of claim 11, wherein all of the plate segments of at least one of the at least two segmented phase plates are made of a same birefringent material.

17. The apparatus of claim 11, wherein the apparatus has same extensions along the optical axis in all of the different partial areas.

18. The apparatus of claim 9, wherein a total number of the different partial areas is at least four.

19. The apparatus of claim 9, wherein the different partial areas each have a portion that is circle segment-shaped in a projection along the optical axis and that adjoins a circle segment-shaped portion of a neighboring partial area both in the direction around the optical axis and in a direction opposite thereto.

20. The apparatus of claim 19, wherein the circle segment-shaped portions of the different partial areas extend over same angles around the optical axis.

21. The apparatus of claim 11, wherein, with a total number $n$ of the different partial areas, the extent of the delay of the phases of the first light beam increases by $2\pi/n$ from partial area to partial area.

22. The apparatus of claim 11, wherein effective crystal axes of the birefringent material are aligned parallel to each other in all of the different partial areas that differently delay the phase of the first light beam as compared to the phase of the second light beam.

23. The apparatus of claim 11, wherein a polarization rotator that is transferable between a first and a second state is arranged upstream of the different partial areas on the optical axis, wherein the polarization rotator, in its first state, alters a polarization of an input light beam in the first linear input polarization direction of the first light beam, and wherein the polarization rotator, in its second state, alters the polarization of the input light beam in the second linear input polarization direction of the second light beam.

24. A use of the apparatus of claim 11 in a common beam path of the first light beam and the second light beam, wherein the first light beam includes fluorescence inhibition light and the second light beam includes fluorescence excitation light, and wherein the phase fronts of the first light beam are shaped selectively such that, in together focusing the first light beam and the second light beam in a sample, an intensity distribution of the fluorescence inhibition light having a local intensity minimum surrounded by intensity maxima and an intensity distribution of the fluorescence excitation light having an intensity maximum at the location of the intensity minimum of the intensity distribution of the fluorescence inhibition light are formed.

25. An apparatus for selectively shaping phase fronts of a first light beam that is incident along an optical axis and that has a first linear input polarization direction running orthogonal to the optical axis, wherein the apparatus comprises at least three different partial areas that follow to one another in a direction around the optical axis, and birefringent optical material arranged in all or all bar one of the different partial areas, wherein the birefringent optical material is arranged such that a first phase of the first light beam is delayed differently in the different partial areas, wherein the birefringent optical material delays the first phase of the first light beam to an extent that increases in the direction from partial area to partial area over a round around the optical axis, wherein the birefringent optical material is arranged such that a second phase of a second light beam that is incident along the optical axis and that has a second linear input polarization direction orthogonal to the first linear input polarization direction and to the optical axis is not delayed differently in the different partial areas, and wherein one of the different partial areas equally delays the first phase of the first light beam and the phase of the second light beam, wherein an optical crystal axis of the birefringent optical material is aligned with the optical axis in the one of the different partial areas that equally delays the first phase of the first light beam and the phase of the second light beam.

26. The apparatus of claim 25, wherein a total number of the different partial areas is at least four.

27. The apparatus of claim 25, wherein the different partial areas each have a portion that is circle segment-shaped in a projection along the optical axis and that adjoins a circle segment-shaped portion of a neighboring partial area both in the direction around the optical axis and in a direction opposite thereto.

28. The apparatus of claim 27, wherein the circle segment-shaped portions of the different partial areas extend over same angles around the optical axis.

29. The apparatus of claim 25, wherein, with a total number $n$ of the different partial areas, the extent of the delay of the phases of the first light beam increases by $2\pi/n$ from partial area to partial area.

30. The apparatus of claim 25, wherein effective crystal axes of the birefringent material are aligned parallel to each other in all of the different partial areas that differently delay the phase of the first light beam as compared to the phase of the second light beam.

31. The apparatus of claim 25, wherein all of the different partial areas are made of a same birefringent material.

32. The apparatus of claim 25, wherein a polarization rotator that is transferable between a first and a second state is arranged upstream of the different partial areas on the optical axis, wherein the polarization rotator, in its first state, alters a polarization of an input light beam in the first linear input polarization direction of the first light beam, and wherein the polarization rotator, in its second state, alters the polarization of the input light beam in the second linear input polarization direction of the second light beam.

33. A use of the apparatus of claim 25 in a common beam path of the first light beam and the second light beam, wherein the first light beam includes fluorescence inhibition light and the second light beam includes fluorescence excitation light, and wherein the phase fronts of the first light beam are shaped selectively such that, in together focusing the first light beam and the second light beam in a sample, an intensity distribution of the fluorescence inhibition light having a local intensity minimum surrounded by intensity maxima and an intensity distribution of the fluorescence excitation light having an intensity maximum at the location of the intensity minimum of the intensity distribution of the fluorescence inhibition light are formed.

* * * * *

UNITED STATES PATENT AND TRADEMARK OFFICE
CERTIFICATE OF CORRECTION

PATENT NO. : 11,460,618 B2
APPLICATION NO. : 16/752885
DATED : October 4, 2022
INVENTOR(S) : Matthias Reuss and Joachim Fischer It is certified that error appears in the above-identified patent and that said Letters Patent is hereby corrected as shown below:

In the Claims

Column 14, Line 14, Claim 18 should read: The apparatus of claim 11, wherein a total number of the different partial areas is at least four.

Column 14, Line 17, Claim 19 should read: The apparatus of claim 11, wherein the different partial areas each have a portion that is circle segment-shaped in a projection along the optical axis and that adjoins a circle segment-shaped portion of a neighboring partial area both in the direction around the optical axis and in a direction opposite thereto.

Signed and Sealed this
Twentieth Day of December, 2022

Katherine Kelly Vidal
*Director of the United States Patent and Trademark Office*